United States Patent
Stöcker

(10) Patent No.: US 10,462,153 B2
(45) Date of Patent: Oct. 29, 2019

(54) PEER-TO-PEER NETWORK AND NODE OF A PEER-TO-PEER NETWORK

(71) Applicant: Carsten Stöcker, Hilden (DE)

(72) Inventor: Carsten Stöcker, Hilden (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/193,704

(22) Filed: Nov. 16, 2018

(65) Prior Publication Data
US 2019/0089716 A1 Mar. 21, 2019

Related U.S. Application Data

(63) Continuation of application No. PCT/EP2016/061080, filed on May 18, 2016.

(51) Int. Cl.
*G06F 7/04* (2006.01)
*H04L 29/06* (2006.01)
(Continued)

(52) U.S. Cl.
CPC .......... *H04L 63/123* (2013.01); *G06Q 20/06* (2013.01); *H04J 3/0667* (2013.01);
(Continued)

(58) Field of Classification Search
CPC . H04L 63/123; H04L 67/104; H04L 67/1078; H04L 67/1093; H04L 67/1095;
(Continued)

(56) References Cited

U.S. PATENT DOCUMENTS

| | | | |
|---|---|---|---|
| 6,377,640 B2 * | 4/2002 | Trans | H04B 1/00 370/286 |
| 7,613,770 B2 * | 11/2009 | Li | H04L 67/104 709/203 |

(Continued)

FOREIGN PATENT DOCUMENTS

EP 1 601 124 A1 11/2005

OTHER PUBLICATIONS

Florian Tschorsch et al., "Bitcoin and Beyond: A Technical Survey on Decentralized Digital Currencies," May 15, 2015, 37 pages, International Association for Cryptologic Research.

*Primary Examiner* — Samson B Lemma
(74) *Attorney, Agent, or Firm* — Reinhart Boerner Van Deuren P.C.

(57) ABSTRACT

The invention relates to a peer-to-peer network having at least one first node with a first clock module and part of a peer-to-peer application. Also included is at least one second node with a second clock module and part of the peer-to-peer application. At least one communication connection between the first node and the second node is establishable. The first node comprises at least one first synchronization clock module. The second node comprises at least one second synchronization clock module. At least the first synchronization clock module is configured to transmit at least one first synchronization clock message to the second synchronization clock module via the communication connection, the second synchronization clock module is configured to synchronize the clock signal of the second clock module to the clock signal of the first clock module based on synchronization information included in the first synchronization clock message.

19 Claims, 7 Drawing Sheets

(51) Int. Cl.
*H04L 29/08* (2006.01)
*G06Q 20/06* (2012.01)
*H04J 3/06* (2006.01)
*H04L 7/00* (2006.01)
*H04L 7/04* (2006.01)
*G06Q 20/22* (2012.01)
*G06Q 20/36* (2012.01)

(52) U.S. Cl.
CPC .......... *H04L 7/0079* (2013.01); *H04L 7/0091* (2013.01); *H04L 7/04* (2013.01); *H04L 67/104* (2013.01); *H04L 67/1078* (2013.01); *H04L 67/1093* (2013.01); *H04L 67/1095* (2013.01); *H04L 67/125* (2013.01); *G06Q 20/29* (2013.01); *G06Q 20/3678* (2013.01)

(58) Field of Classification Search
CPC ... H04L 67/125; H04L 7/0079; H04L 7/0091; H04L 7/04; G06Q 20/06; G06Q 20/29; G06Q 20/3678; H04J 3/0667

USPC .......................................................... 726/4
See application file for complete search history.

(56) References Cited

U.S. PATENT DOCUMENTS

| | | | |
|---|---|---|---|
| 8,018,956 B1* | 9/2011 | Deng | H04L 1/187 370/401 |
| 8,543,829 B2* | 9/2013 | von Krogh | G06F 21/34 713/185 |
| 9,667,370 B2* | 5/2017 | Tzeng | H04J 3/0673 |
| 2001/0038674 A1* | 11/2001 | Trans | H04B 1/00 375/355 |
| 2002/0181633 A1* | 12/2002 | Trans | H04B 1/00 375/354 |
| 2008/0005114 A1* | 1/2008 | Li | H04L 67/104 |
| 2015/0063375 A1* | 3/2015 | Tzeng | H04J 3/0673 370/512 |

* cited by examiner

PEER-TO-PEER NETWORK AND NODE OF A PEER-TO-PEER NETWORK

CROSS-REFERENCE TO RELATED PATENT APPLICATION

This patent application is a continuation of PCT/EP2016/061080, filed May 18, 2016, the entire teachings and disclosure of which are incorporated herein by reference thereto.

FIELD

The invention relates to a peer-to-peer network comprising at least two nodes. Furthermore, the invention relates to a method for operating a peer-to-peer network and a node, a first node and a second node.

BACKGROUND

It is known from prior art to use centrally organized systems to offer one or more services to other devices. In particular, a server may provide at least one service for one or more other devices, so called clients. Such an architecture is called a client-server model. One or more server(s) can provide one or more functionality(ies) and service(s), respectively, such as sharing data or resources among multiple clients, or performing computation for a client.

A typical prior art system is shown in FIG. 1. The depicted system 100 comprises a first entity 101 in form of a client device 101, a further entity 103 in form of a further client device 103 and a central system 106 in form of a central server 106. For instance, the first entity 101 and/or the second entity 103 may be a desktop computer, mobile computer, mobile phone, etc.

In order to communicate with each other, a standard communication network 108 comprising wireless and/or wire lines, such as a LAN (Local Area Network) or the internet, is provided. Each of the devices 101, 103, 106 comprises at least one communication module 110, 112, 114 configured to establish a communication connection with the standard communication network 108. Hence, the devices 101, 103, 106 can communicate with each other.

The server 106 comprises a service application 116 configured to provide at least one service for the client devices 101, 103. The offered service may be the conduction of an action, such as a financial transaction, an evaluation of a data set, etc. In order to initiate or trigger such an action, the first client device 101 and/or the further client device 103 communicate with the server 106. Thereby, confidential data can be exchanged between the server 106 and one or more of the client devices 101, 103. This data can be processed by the server 106 and the result can be transmitted to one or more of the client devices 101, 103.

Common to such prior art systems are that a central subsystem, a central process and/or a central organization or instance is provided in order to manage and, in particular, conduct a service action.

Technically speaking, as previously described, a corresponding system for conducting a service is realized according to prior art by a client-server structure. The central organization or instance is created by one or a plurality of central servers. A server of this kind or a platform can be distributed and located on different computing devices, for example. This means that a virtual server can be realized by a cloud. For example, a centrally arranged database can be provided.

In particular, as described herein before, a central instance/server is configured to perform at least one action as a service for an entity. Thereby, the central server is used as a confidential instance for conducting the action. The central instance, such as a server or a platform, defines the rules, such as one or more evaluation rule(s). The central server ensures that the actions or processes are carried out correctly for all entities involved. In other words, a central instance prevents tampering by one of the participating entities and/or by third parties.

The disadvantage of server-client structures of this kind, particularly the server (or platform), apart from the high transaction costs, is that the central instance or central server manages confidential data of the users of the at least one entity. A persistent problem affecting the central instance is that of protecting the confidential data stored on one server or a plurality of servers from access by unauthorized third parties. In particular, a high degree of security expenditure is required in order to prevent user data (e.g. registered peer-to-peer identifications), billing data, location data of the user, etc. from being tampered. This in turn leads to higher transaction costs.

In order to avoid the issues related with a central system, such as a server, due to recent developments client server structures are substituted by so called peer-to-peer networks. A peer-to-peer network, also called computer-to-computer network, comprises a plurality of [computer] nodes. In particular, at least one first node and at least one further or second node can be provided. Each of these nodes comprises at least a part of a peer-to-peer application. In the peer-to-peer application data can be stored and/or processed. Thereby, data written into the peer-to-peer application is stored by a plurality of nodes. For example, it may be provided that after a positive verification of written information in the peer-to-peer application this information is saved by all nodes, at least by a part of the nodes.

For storing new information in a tamper-proof way, a link can be established between the new information and at least one previously stored information. Such a storing process requires a good time synchronization and clock synchronization, respectively, between the plurality of nodes. Each prior art node comprises therefore a clock module wherein each of these modules receives a clock synchronization signal from a central clock server. However, a general issue of such a peer-to-peer network is that a clock offset between the clock signals of different nodes of the peer-to-peer network may occur due to the use of the central clock server and e.g. physical delays or latencies in the communication network used. Such a clock offset may cause that the data stored in the peer-to-peer application may differ between different nodes. This in turn leads to the problem that the data is not stored in a time consistent way and/or tamper-proof way. This can, for example, be an issue when low latency or high frequency transactions are required that need to be executed in the order of the time when the transaction was initiated.

A further issue of prior art peer-to-peer network is that after an operation error of a node, such as an interruption of the power supply of the node, the data stored in the peer-to-peer application and on the node with the error may differ from the data stored in the peer-to-peer application and on the further nodes of the peer-to-peer network. Thereby, it is a general concern to restore the full functionality of the node as soon as possible. In particular, a fast data synchronisation of the data stored in the peer-to-peer application and on the node with the error and the data stored in the peer-to-peer application and on the further nodes of the peer-to-peer network is required.

Therefore, it is an object of the present invention to provide a peer-to-peer network having at least two nodes, which enables a tamper-proof storing of data in a peer-to-peer application and, in particular, which allows the restoration of a full functionality of the node after occurrence of operation error within a short period of time.

BRIEF SUMMARY

The object is solved according to a first aspect of the invention by a peer-to-peer network as described herein. The peer-to-peer network comprises at least one first node comprising at least one first clock module. The first node comprises at least a part of at least one peer-to-peer application. The peer-to-peer network comprises at least one second node comprising at least one second clock module. The second node comprises at least a part of the peer-to-peer application. The peer-to-peer network comprises at least one establishable communication connection between the first node and the second node. The first node comprises at least one first synchronization clock module. The second node comprises at least one second synchronization clock module. At least the first synchronization clock module is configured to transmit at least one first synchronization clock message to the second synchronization clock module via the communication connection. The second synchronization clock module is configured to synchronize the clock signal of the second clock module to the clock signal of the first clock module based on synchronization information included in the first synchronization clock message.

In contrast to the prior art, the peer-to-peer network according to the present inventions enables to store data in a peer-to-peer application in a tamper-proof way by providing an improved (time) synchronization mechanism. Clock offsets between a clock signal of the first node and a clock signal of a second node are at least reduced by transmitting first synchronization clock message(s) from the first node to the second node, wherein the at least one message comprises synchronization information suitable to synchronize the clock signal of the second node and a clock signal of a first node. Hence, at least all second nodes can be synchronized in time by transmitting synchronization clock message(s) from first node(s) to the second nodes.

By the fact that instead of a central server or a platform, a peer-to-peer network (also called a framework) undertakes the in particular tamper-proof storing of data by means of a peer-to-peer application a process, action or the like can be securely controlled and/or conducted. In the case of a peer-to-peer network, high security standards are achieved in that all nodes (computer nodes) in the peer-to-peer network, at least a part of the (peer) nodes in the peer-to-peer network, monitor(s) at least the accuracy of e.g. stored data. Any transaction costs can be significantly reduced. No central, superior platform, server, cloud, etc. is required.

The peer-to-peer network comprises two or more nodes. A node is formed by a computing device (computer node). A node can comprise one or more module(s). The node can be formed by software and/or hardware. Preferably, each node comprises at least a part of at least one peer-to-peer application. In comparison to a client-server network in which a server provides a service and a client uses the service, these roles are cancelled in the peer-to-peer network. Each participant of the peer-to-peer network can use a service and the like and offer such a service. In particular, a peer-to-peer network is self-determined and/or self-organized (without any higher-level units). In the present case preferably each computer and node, respectively, of the peer-to-peer network comprises the peer-to-peer application.

In addition, a peer-to-peer module of e.g. an entity may be configured to communicate, e.g. send messages to the peer-to-peer application and/or read data stored in the peer-to-peer application. The peer-to-peer module may be a peer and node, respectively, of the peer-to-peer network. By communicating with the peer-to-peer application the peer-to-peer module may be controllable by the peer-to-peer application.

By way of example, the peer-to-peer application can directly transmit data to a peer-to-peer module of an entity. This may mean that the peer-to-peer module reads said data from the peer-to-peer application. Alternatively and/or additionally, the peer-to-peer module can write data to the peer-to-peer application. This data is stored in the peer-to-peer application in a tamper-proof way.

Furthermore, each node may comprise a clock module configured to generate an (internal) clock signal. The clock signal can be provided to one or more (processing) modules of the node. The first node comprises a first synchronization clock module in particular configured to generate (time or clock) synchronization information (e.g. time signal or data). For instance, the synchronization information can be derived from the clock signal of the first clock module of the first node. The first synchronization clock module is configured to transmit this synchronization information to the second node by transmitting a first synchronization clock message having said synchronization information to the second node.

Upon receipt of the first synchronization clock message, the second synchronization clock module of the second module synchronizes the clock signal of the second clock module. Thereby, the clock signal of the second node is directly synchronized in accordance with the clock signal of the first clock module by using the received synchronization information. A clock server is not required. A better (more accurate) and faster (time) synchronization can be achieved by directly synchronizing the second clock module to the first clock module.

It may be possible that upon synchronization of the second clock module the second synchronization clock module my transmit a further synchronization clock message to a further node, wherein the further synchronization clock message comprises further synchronization information (e.g. based on the synchronized clock signal of said second node). The further node can, upon receipt of said further synchronization information, synchronize the clock signal of its clock module based on the further synchronization. In other words, the previously denoted second node may by the first node and the further node may be the second node.

According to a first embodiment of the peer-to-peer network of the present invention, the first node may comprise a first signing module configured to sign the first synchronization clock message with a signature. The signature may be preferably a unique (peer-to-peer) signature assigned to the node. In particular, each node in the peer-to-peer network may have a unique signature. By signing the first synchronization clock message (preferably, every pre- and/or synchronization clock message can be signed) at least the receiver of the message can evaluate the correctness of the received message. For instance, in the peer-to-peer application at least a part of the signatures can be stored. Then, by means of the peer-to-peer application at least the receiver can check the correctness of the message by comparing the signature of the message with the signatures stored in the peer-to-peer application. Preferably, the signature of the message, and thus, the message itself, can be validated by at least a part of the nodes of the peer-to-peer network. An unauthorized manipulation of such messages can be detected, and thus, avoided.

According to a preferred embodiment, the first synchronization clock module may be a master synchronization clock module. The one or more second synchronization clock module(s) of respective second node(s) may be slave synchronization clock module(s). The master synchronization clock module may preferably comprise an input means configured to receive at least one (external) master synchronization clock message comprising a master time signal. "External" means in particular that the time signal is provided by a unit not part of the peer-to-peer network. For instance, the (external) source can be an atomic clock unit (e.g. for providing a ground based or a satellite based time reference signal) which provides a very precise master time signal. The synchronization information included in the first synchronization clock message may be at least based on the master time signal. Preferably, the clock signal of the first clock module of the first node directly depends from the master time signal. The first synchronization clock module may be configured to synchronize the clock signal of the first clock module in accordance with the master time signal. Further, the first synchronization clock module may be configured to generate the synchronization information at least based on the master time signal.

Preferably, the at least one master synchronization clock module (and/or the at least one node comprising the at least one master synchronization clock module) is registered in a peer-to-peer time reference service application. It shall be understood that a node can sign-up for a decentral time reference service which might be paid in cryptocurrencies. Accuracy and reputation of a decentral time reference service can be stored in the peer-to-peer network.

It shall be understood that a peer-to-peer network may comprise one or more master nodes each having a master synchronization clock module.

In order to achieve high time synchronization accuracy, the first synchronization clock message may comprise synchronization information for adjusting a clock offset and/or a phase offset of the clock signal of the second clock module compared to the clock signal of the first clock module. Preferably, the synchronization information comprises time information which allows adjusting and synchronizing, respectively, the clock offset and the phase offset of the clock signal of the second clock module.

It has been recognized that due to the transmission of a first synchronization message a time delay occurs between start time point of the transmission and the reception time point of the message (signal propagation delay). In order to take the delay into account, according to a further embodiment, the first synchronization clock module may be configured to determine the synchronization information included in the first synchronization message (transmitted to the second clock module) depending on a delay information derived from a previous exchange of at least two pre-synchronization messages between the first synchronization clock module and the second synchronization clock module. It may be possible that more pre-synchronization messages (e.g. four) can be exchanged during a pre-synchronization process. For instance, in a pre-synchronization process, pre-synchronization messages can be exchanged between the first synchronization clock module and the second synchronization clock module. The first synchronization clock module may send a first pre-synchronization message comprising a first time marker (time of dispatch of said message) to the second synchronization clock module. The second synchronization clock module determines the reception time point of the first pre-synchronization message based on the clock signal of the second node. Further, the second synchronization clock module may send a second pre-synchronization message comprising a second time marker (time of dispatch of said message) to the first synchronization clock module. The first synchronization clock module determines the reception time point of the second pre-synchronization message based on the clock signal of the first node. In addition, the first and/or second synchronization clock module(s) may respond to a previously described and received pre-synchronization message by sending a further pre-synchronization message as a response to the respective clock module. The further pre-synchronization message may comprise as timer marker(s) the respectively determined reception time points. Based on the four time markers, the first node-to-second node delay and the second node-to-first node delay can be determined. Preferably, the mean value of the determined delay can be calculated and used to generate the synchronization information to be used to synchronize the clock signal of the second node.

In a further embodiment, a peer-to-peer application transaction (e.g. based on a transaction agreement) may be triggered by a participant of the peer-to-peer application e.g. by a decentral application (Dapp) running on a node which. The triggered peer-to-peer application transaction may require a particular high accuracy (compared to usual operation(s)) of the time when the transaction was triggered. This time information may be stored in the peer-to-peer application in order to put transactions into a specific time sequence (e.g. in case of trading application transactions). In order to avoid manipulation of time data and to ensure accuracy, the transaction is time stamped and immediately send (propagated) to surrounding peers.

In addition, the peer-to-peer application may trigger the clock synchronization module to send a time synchronization message at the same time to one or more (surrounding) node(s) of the sending node. A surrounding node may be a node in direct neighborhood to the sending node. The one or more surrounding node(s) may then check the validity of the time stamp of a transaction by comparing the time stamp with their own clock module. The time synchronization message may be received and/or a propagation time delay may be measured by a node before. The one or more surrounding node(s) can now validate the timestamp of the transaction. For instance, the one or more surrounding node(s) can confirm the time stamp or—depending on a peer-to-peer application protocol—adjust the timestamp following a consensus principle.

One or more surrounding node(s) might propagate the transaction to further nodes for further time stamp validation. In a further embodiment, the number or distribution of nodes for time stamp validation can be controlled via a time stamp validation protocol. Transaction and its validated time stamp may then be stored in the peer-to-peer application. The peer-to-peer application might validate the transaction in a later step.

In a peer-to-peer network, operation errors of one or more nodes can occur. Exemplified operation errors may be a functional error of a module, an interruption of a node from the power supply (e.g. due to power outage of the electrical supply network), an interruption of one or more communication connections with other node(s), etc. Such an operation error is always critical for a peer-to-peer network since the high security is normally achieved by storing at least a part of the data of a peer-to-peer application on every node of the peer-to-peer network. Due to a temporary error, the data stored on said node may be not synchronic with the data stored on the other nodes. Hence, there is a need for fast data synchronization.

According to a particularly preferred embodiment of a peer-to-peer network of the present invention, the at least one node may comprise at least one controlling module having at least one detecting means configured to detect at least one operation error of the node. The controlling module may comprise at least one evaluating means configured to evaluate whether the detected operation error requires data synchronization of the data stored in the peer-to-peer application of (and on) the node. The controlling module may comprise at least one initiating means configured to initiate a data synchronization action if data synchronization is required.

The detecting means may be configured to detect at least one operation error of the node including e.g. abnormal operations. For instance, the detecting means can be configured to detect a reboot process of a node. Such a reboot process (or another abnormal operation) may be an indication that at least one operation error has occurred. Further examples of abnormal operations are that a processing routine was aborted or in an infinite loop was started (e.g. via a watchdog timer], a break-down of system power occurred, a regular clock-synchronization timer did not synchronize as defined by regular intervals, a break-down or degradation of network connectivity occurred. Upon detection of such an indication, the evaluating means may check whether data synchronization is required. Thereby, data synchronization means in particular that the data stored in the peer-to-peer application on said node is synchronized with the data stored in the peer-to-peer application on at least one further node of the peer-to-peer network. For instance, if on said node (having said detected error] compared with the further node less data is stored, the not stored data on said node can be transmitted from the further node to said node in order to conduct a data synchronization.

Further, checking whether data synchronization is required includes checking whether data synchronization is potentially required. For instance, the evaluating means can check when data was stored for the last time on said node. If e.g. the determined time period increases a preset time period, it can be followed that data synchronization is required (although it may be possible that actually no data synchronization is required since also on the other nodes no additional data was stored during the determined time period).

Alternatively or additionally, the evaluating means can compare the last stored data on said node with the last stored data on the further nodes. A discrepancy between the stored data may be an indication that data synchronization is required. If a discrepancy is not determined data synchronization may not be required.

The controlling module may further comprise at least one initiating means configured to initiate a data synchronization action if the evaluation result indicates that data synchronization is required. This enables to initiate a data synchronization process in a fast way.

It is noted that the described data synchronization process itself is inventive independently of the previous described clock signal synchronization. In particular, the node may comprise besides the specifically configured controlling module (only) at least a part of the peer-to-peer application (without the need of the specifically configured synchronization clock module).

According to a further embodiment, the initiating means of the controlling module may be configured to initiate data synchronization by transmitting a data synchronization indication to at least one communication module of the node. The communication module may be configured to transmit a data synchronization request message to at least one further node of the peer-to-peer network upon receipt of the data synchronization indication. The communication module may be any communication module which is capable to establish a communication connection with at least one (corresponding) communication module of the further node. B way of example only, a communication module may be a wide area network (WAN) communication module, a local area network (LAN) or the like. The data synchronization request message may indicate that the transmission of data from the further node to said node is requested. Such a data synchronization request may comprise details about the data to be transmitted. For instance, a time indication indicating a time point of the last stored data on said node (having the detected error). The further node can derive from this time point which data has to be transmitted from the further node to said node.

Preferably, the communication module of the node is configured to transmit the data synchronization request to one or more neighbored further nodes. In order to accelerate the data synchronization process, the communication module of the node may be configured to transmit the data synchronization request to one or more further nodes within a predefined distance.

In order to provide a particular fast data synchronization, according to a further embodiment the communication module of said node may be further configured to perform, upon receipt of the data synchronization indication, at least one data synchronization action from the group of data synchronization actions comprising:

providing the data synchronization request message with a priority information, and transmitting at least one bandwidth allocation request message to at least one communication network controlling unit.

A priority information may be a flag, such as a quality of service (QoS) flag. By providing the data synchronization request message (to be sent) with such a priority information, the data synchronization traffic required for data synchronization can be prioritized. More particularly, a further node receiving a data synchronization request message with a priority information may change its internal processes. E.g. calculation processes or the like can be interrupted and the available processing power of a node can be at least mainly used to support the data synchronization, e.g. to transmit the required data to said node.

Further, data packets comprising the priority information may have priority in comparison with other data packets. Preferably, every data packet transmitted during a data synchronization process, such as data packets comprising at least a part of the requested data, can be provided with a priority information.

Alternatively or additionally, the communication module may be configured to transmit at least one bandwidth allocation request message to at least one communication network controlling unit. By transmitting a bandwidth allocation request message it is in particular requested to increase the available bandwidth of the at least one communication connection to be used for the data synchronization process, such as for transmitting the required data.

The communication network controlling unit, according to a further embodiment, may comprise at least one bandwidth allocation module configured to modify the available bandwidth of at least one communication connection between the node and the further node. The bandwidth allocation module may be configured to increase the (available) bandwidth of the communication connection between the node and the further node at least based on the received bandwidth allocation request message. For example, upon receipt of a bandwidth allocation request message comprising details about the communication connection(s) and/or the desired bandwidth, the bandwidth allocation module may increase the bandwidth of the at least one communication connection. It shall be understood that at the same time bandwidth of one or more other communication connection(s) may be reduced.

According to a preferred embodiment, the bandwidth allocation module may be further configured to check upon receipt of the bandwidth allocation request message at least one preset authorization criterion. The bandwidth allocation module may be configured to increase the (available) bandwidth of the communication connection only in the case the at least one preset authorization criterion is met by the node. By checking the authorization of a receipt bandwidth allocation request message, a bandwidth increase due to an unauthorized request can be avoided. The at least one preset authorization criterion may be a (unique) identification of an authorized node. Preferably, all (unique) identification of all authorized nodes can be stored in a storage e.g. of the communication network controlling unit. Further, each bandwidth allocation request message can be provided by an identification of the sending node, e.g. by signing the request with a unique peer-to-peer signature (or other (unique) identification). By conducting a comparison of the received identification and the stored identification, it can be checked whether the requesting node is authorized or not. Only in the case of a positive result (i.e. the requesting node is authorized), the bandwidth allocation module may increase the bandwidth.

As described hereinbefore, the at least one preset authorization criterion can be stored in a database of the communication network controlling unit. In order to increase the safety of the stored at least one preset authorization criterion, such as one or more identification(s) of authorized nodes, according to a preferred embodiment, the communication network controlling unit may comprise at least one peer-to-peer module at least configured to read at least one preset authorization criterion stored in the peer-to-peer application or in a database controlled by the peer-to-peer application. The bandwidth allocation module may be configured to compare an authorization information (e.g. a signature) included in the bandwidth allocation request message with at least one read preset authorization criterion. Only in the case of a positive result (i.e. the requesting node is authorized], the bandwidth allocation module may increase the bandwidth.

A further issue of prior art networks, e.g. peer-to-peer networks, is that a communication between a node and a further unit, such as a sensor and/or actor, can be manipulated. More particularly, in prior art systems a sensor and/or actor can be manipulated or the communication between a sensor and actor, respectively, and a node of a peer-to peer network can be manipulated. In order to provide at least a tamper-proof communication between a further unit and a node of the peer-to-peer network, according to a preferred embodiment of a peer-to-peer network of the present invention, the peer-to-peer network may comprise at least one further unit in form of at least one sensor and/or at least one actor configured to communicate with at least one node. It shall be understood that the peer-to-peer network may comprise two or more sensors, two or more actors and/or two or more combined actor/sensor units. The further unit may comprise a unique peer-to-peer identification registered in the peer-to-peer application. In other words, the further unit may be registered in the peer-to-peer application as a smart asset. Preferably, the unique identification can be assigned to the further unit during the production of said further unit. Alternatively or additionally, in course of a registration process, the peer-to-peer application may create a unique peer-to-peer identification for the further unit.

Preferably, the unique peer-to-peer identification of the at least one further unit may be stored in the peer-to-peer application or a database controlled by the peer-to-peer application. The further unit may comprise at least one signing module configured to sign a message to be sent to the node. The signing may preferably depend or be based on the unique peer-to-peer identification of the further unit. Signing means in particular hashing, time-stamping, and/or encrypting of a message and data of the message, respectively, providing the message with a signature. By signing a message, at least the receiver of the message, i.e. the receiving node, can validate the message. For instance, a sensor can send a signed message comprising a sensor data set to the node. The node, preferably by using a specifically configured controlling module, can validate the correctness of the message by evaluating e.g. the signature of the message by using the unique identification(s) of registered unit(s) stored in the peer-to-peer application or a database controlled by the peer-to-peer application. Only in case the signature is valid, i.e. corresponds to a registered further unit, the node may further process the message. Preferably, two or more nodes of the peer-to-peer network can validate a message. An actor may also send messages, such as acknowledge messages. A particular secure and tamper proof communication between a further unit and a node of a peer-to-peer network can be provided.

It is noted that the described secure data communication between a further unit and a node of the peer-to-peer network is itself inventive independently of the previous described clock signal synchronization or data synchronization process.

According to a further embodiment of the peer-to-peer network, the further unit may be (uniquely) assigned to at least one node of the peer-to-peer network. The assignment between the further unit and the node may be stored in the peer-to-peer application or a database controlled by the peer-to-peer application. A message sent from a further unit to a node of the peer to peer network may be only regarded as valid, if at least the receiving node confirms, preferably by accessing the stored assignment(s), that the sending further unit is actually assigned to the node. Then the message can be further processed. Otherwise the message is not processed. The communication between further units and nodes can be further secured.

Preferably, the assignment of a further unit to one or more node(s) can be done depending on the distance of the further unit to a node (e.g. a further unit may be assigned to a node having the lowest distance) and/or functional similarities.

In order to reduce the risk of a manipulation of the data of a further unit prior to sending said data, according to a further embodiment, at least one technical specification data set of the further unit may be stored in the peer-to-peer application. At least the receiving node of a message is configured to validate the data included in the message received from the further unit based on the stored technical specification data set. Preferably, the technical specification data set comprises technical parameter(s) which is/are characteristic for said further unit. For instance, the technical specification data set can comprise data over the life cycle and/or quality assurance data from production and/or maintenance and re-calibration data, respectively, or test activity data of the further unit. The controlling unit may be configured to evaluate a data set received from a particular further unit by using the stored technical specification data set. If a deviation is detected, different action can be initiated. For instance, a deviation may be an indication of a malfunction of the further unit (e.g. requiring a maintenance action) or of a manipulation or of an incorrect calibration. The security can be further improved.

A peer-to-peer application can look-up the technical specification data set(s), e.g. a tamper-proof digital product memory of a further unit, in another peer-to-peer application. The peer-to-peer application can validate the identification of a node and/or its sensor(s) and/actor(s) and/or the attributes and technical specification data set, respectively, including quality assurance data of a sensor (e.g. sensor calibration or test data when it was produced or maintained).

Preferably, the signing module can be implemented as a peer-to-peer module or can be implemented as a trusted enclave. Following the process described above a peer-to-peer application can validate correctness, authenticity or integrity of sensor data provided. In addition by looking up further unit specification or quality assurance data the peer-to-peer application can also validate the accuracy of the further unit, e.g. sensor, data provided.

A similar process can be applied for actor data. An actor can comprise a peer-to-peer module. The peer-to-peer module can configure the actor to accept messages from the peer-to-peer application and/or one or more node(s) (assigned to the actor) of the peer-to-peer network in a tamper-proof way. The peer-to-peer module of the actor may comprise the signing module (for hashing, time-stamping, signing and/or encrypting of data or messages) to send acknowledgement messages to the peer-to-peer application and/or the one or more node(s) e.g. to confirm that it has reacted to a previously received instruction message in a specific way. With a signed message a peer-to-peer application, network and/or one or more node(s) of the network can validate authenticity. A node can validate specifications, quality assurance data or maintenance re-calibration and/or test data check how an actor will react to a control signal and instruction message, respectively. It shall be understood that reaction of an actor to a control signal can be measured by sensor(s) e.g. to check that actor(s) is/are working as specified. Deviations can be stored in the digital product memory of the actor and/or the peer-to-peer application or a database controlled by the peer-to-peer application. With this process the peer-to-peer application, network and/or node(s) of the peer-to-peer network may identify malfunctions and/or deviations in an expected behaviour of a sensor/actor. The peer-to-peer application, network and/or node(s) of the peer-to-peer network can trigger maintenance activities or adjusts the control parameter accordingly.

A further issue of prior art networks, such as peer-to-peer networks, is that a node may run several de-central applications. Each of these applications on the node may need a downtime for upgrades. According to a further embodiment, at least one node may comprise two or more processing modules. In other words, the node can be clustered (e.g. two or more processing devices in one note or a communication link and clustering controller between two or more physical nodes that is combining these physical nodes into one or more logical nodes). This means that in case of a software upgrade of one application and software, respectively, the node or a cluster of nodes can use one processing unit for conducting the upgrade and can continue to work with at least one further processing unit in order to eliminate or reduce downtime of a node in particular for critical functionalities or services. Decentral applications running on the node or a cluster of nodes may be prioritised by a task manager module of the node. A task manager module and/or a software or data upgrade process may be controlled by the controlling module of the node. Parameter(s) for this process may include priorities of applications running on the node which may be prioritised by the peer-to-peer application during the upgrade process. A peer-to-peer application or a Dapp may request a software update by sending a software and/or data upgrade request message to the node or the controlling unit. The node may validate the said request message and the authenticity of software and data via hash codes and/or certificates. The controlling module can also steer resource allocation and/or task assignment among units in the cluster of nodes during standard operations of a node or a cluster of nodes.

A further issue of prior art systems is that deployment of software and/or data is not yet tamper-proof. According to a further embodiment, at least one node may be configured to control software running on the node and/or a (surrounding) further unit wherein the software can be (at least partly) executed on a trusted execution environment. By using a trusted execution environment a peer-to-peer application can deploy (decentral) applications and/or firmware upgrades in a tamper-proof way. The controlling module can steer a software data deployment process for one or more further units. The controlling module itself might be running on a trusted computing environment.

A further issue of prior art networks, such as a peer-to-peer network, is that these networks are not yet saleable. With the further progression of concepts for scalability, processing and/or validation activities may not run on all nodes but on a sub-group of nodes. There are also different peer-to-peer application technologies/protocols and different resource requirements for different decentral application including algorithms running on a node that are exchanging data with a peer-to-peer application. By the means of load balancing and/or dynamic resource allocation a network for a peer-to-peer application or a network/system of peer-to-peer applications can make proper use of computation resources. Load balancing and/or dynamic resource allocation can be steered by the controlling module across nodes based on parameters/priorities provided by the peer-to-peer application.

A further issue of prior art peer-to-peer network is that [high-performance] hardware resources (computing, storage, network, TPM chips) are not yet shared among peer-to-peer applications and/or decentral applications. Sharing can be achieved by the means of virtualisation. The controlling module can provide a virtualisation layer. On this virtualisation layer many (virtual) computing, storage and/or network instances can be run.

A further issue of prior art peer-to-peer network is that significant trusted execution environment resources (e.g. enclaves or Intel SGX) are not yet available for a node or a peer-to-peer network. According to a further embodiment, at least one node can have access to one or more trusted execution environment(s) or can manage a pool of trusted execution environment(s). A node can register these environments in the peer-to-peer application. Other entities can be given access to the trusted execution environment via the peer-to-peer application. Computation in form of smart and private contracts can be facilitated via the peer-to-peer application. Resource usage can be measured and paid via crypto currencies. A controlling module can measure resource usage and/or steer trusted execution environment resource allocation.

A further issue of prior art systems is that they can be physically or digitally intruded. For instance, an attacker can either try to physically intrude a node and manipulate one or more pieces of hardware of the node (e.g. sensors, actors, computation or storage device(s)) or to digitally intrude the system with a hack. Protection against intrusion can be achieved by a (physical) intrusion detection module. The intrusion detection device may be configured to communicate with the controlling module of the node. In case a possible intrusion is detected by the intrusion detection module the controlling module might submit the status to the peer-to-peer application in order to inform other node(s) that this particular node might have been compromised by an attacker. Thereby, the at least one other node can be informed that any data of the at least potentially attacked node might have been manipulated. As result of such information, a reputation factor of the potentially attacked node may be (automatically) downgraded by the peer-to-peer application. Further, other nodes might be informed about the detected intrusion. In addition, a security event can be triggered by the peer-to-peer application including a task to verify and/or maintain the node. The controlling module might also (irreversible) shut down parts of the node to prevent manipulation by an intruder and inform the peer-to-peer application of its status.

According to a further embodiment, the at least one peer-to-peer application can be a decentralized register or a shared database storing transaction and data with given certain proofs or signatures. In addition to transactions and data, the decentral register can store computer code acting as e.g. means for evaluating or sending data. In particular, the code can be invoked by a transaction to the address of the code in so called 'smart contracts'. This code is processed on the two or more nodes of the peer-to-peer network.

A decentralized register can be readable at least by a part of the participants of the peer-to-peer network. In particular, every (computer) node including can comprise the peer-to-peer application. The decentralized register may be read at least by each participant of the peer-to-peer network. In particular, all peer-to-peer modules and all nodes of the peer-to-peer network can preferably read all information in the peer-to-peer application formed as a register. Preference is also that all peer-to-peer modules and/or all nodes of the peer-to-peer network can send messages to or write messages to the peer-to-peer application. A message or transaction sent to a smart contract will start the execution of the code of the smart contract while using data stored in the smart contract.

The peer-to-peer application can be built upon the following elements: PEER-TO-PEER network, Consensus System/Protocol, Data Structure, Merkle Trees, Public Key Signatures, Byzantine Fault Tolerance. It replicates data based on a consensus principle. It is auditable and traceable. Each of these systems may be comprised by a peer-to-peer network.

In a simple way information can be made available to preferably all participants. This allows to carry out a review of the information and data, respectively, stored in the decentral register (e.g. authorization criterion(s)) or the code executed in the decentral register. Particularly preferably, each node in the peer-to-peer network can be configured to review new information, in particular, based on older information stored in the peer-to-peer application. Hence, in order to review and evaluate new information high data synchronization is required.

Moreover, preferably each (computer) node can in each case comprise the complete data content of the peer-to-peer application, but include at least a portion of the data contents of the peer-to-peer application, in particular, of the decentral register. For example, it may be provided that after a positive verification of written information in the peer-to-peer application this information is saved by all nodes, at least by a part of the nodes. The tamper resistance of the data stored in the peer-to-peer application can thereby be further improved.

In order to store new information in a tamper-proof way, the peer-to-peer application can comprise encryption means and/or signature means and/or verification means, wherein at least one of the encryption means and/or signature means and/or verification means is configured to store data. In particular, it can be provided that by the hash function a link is established with at least one previously stored information in the decentral register. Further data, such as request messages, ordinary, contextual and/or transaction data of an entity, such as a vehicle, can be stored. The signature means can act as the above described signature module.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present peer-to-peer network, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, data stored or to be stored on the block chain can be checked without the need of a central server. In addition, the block chain can be used to generate messages, transaction agreements between at least two entities and the like. The generation can be caused by at least one peer-to-peer module in a tamper-proof manner. The block chain according to the present embodiment is particularly a decentralized, peer-to-peer-based register in which all data related to an action and other messages sent by peer-to-peer modules can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts.

Data of the peer-to-peer application can be stored in/on the "decentral ledger technology" and/or the decentral ledger steers (encrypted) data storage accessible via the internet and preferably in de-central data storage entity such as Interplanetary File System (IPFS) or in a distributed Blockchain database (e.g. BigChainDB). For instance, one or more authorization criterion(s) can be stored in a de-central data storage controlled by the peer-to-peer application, such as a block chain. Access to the encrypted data to third party entities is managed via identity and access management transactions or smart contracts via the block chain.

In addition, data feeds can be provided by the peer-to-peer application (so called "smart oracles", e.g. master synchronization clock message(s)). Data can be captured from trusted sources off-chain and stored on the block chain or stored via the block chain on a decentral data storage entity.

Information among (peer-)nodes can be exchanged by a peer-to-peer messaging system (e.g. Whisper). This means a peer node can send a message to another peer node to submit an information or to trigger an action. Messages can be clear text, signed and/or encrypted. This means that not all data exchanged among the nodes must be stored on the block chain.

In a further embodiment, the at least one peer-to-peer network can be formed by a plurality of (computer) nodes and one or more peer-to-peer module, such as a peer-to-peer module assigned to an entity, such as a vehicle, mobile terminal, user, etc., is/are only configured to communicate with the plurality of nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network there can be only one validating node or full node, e.g. only one node can be configured to perform a validation process. In addition, the peer-to-peer network may comprise one or more observing nodes. An observing node can validate transactions to establish a trust level but does not validate all transactions which is done by the validating node.

In an alternative embodiment, the peer-to-peer module is one of the nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, transactions or the like to the peer-to-peer application via the API. The decentral application so called "Dapp" is at least configured to process and transmit the meter data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Further processing of data, such as evaluating of data, can be done on-chain or off-chain. Off-chain data processing, evaluating and/or validation can be managed by the peer-to-peer application, like the code on the block chain. Powerful means in particular a high computing power. In other words, in the present case a valid entry in the peer-to-peer application, such as a block chain, is assumed if (only) a part of the nodes comes to a positive result. It shall be understood that only a single, especially particularly powerful node can perform the processing or validation process. In a further embodiment, the block chain may delegate computing tasks to one or more resources. It either trusts one resource or it applies a consensus principle while delegating similar processing tasks to many resources.

Data and transactions stored on the block chain do not provide "transactional privacy". Transactions between pseudonyms may be (often) stored in clear text on the block chain. In some cases data stored on the block chain are encrypted and the keys may be handled via the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure HW enclave for attestation and sealing that cannot be manipulated by other software code running on the devices. In a further embodiment, secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition, selective privacy can be achieved by sharing keys to decrypt transactions for reporting and auditing purposes.

Similarly, in an alternative (not shown) embodiment, a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment, the peer-to-peer application can be formed using multiple block chains.

These block chains are connected via frameworks, such as sidechains or smart contracts.

Financial values can be [instantaneously) exchanged with a transaction via a cryptocurrency. In a further embodiment, micropayment channels are used for a constant payment stream that can be handled party off-chain to reduce the amount of on-chain transactions. In a further embodiment so called state channels or state networks (e.g. Raiden Network) may be used to exchange digital tokens off-chain in a secure way. Opening and/or closing of state channels may be registered on the block chain. This means that individual transactions may not be stored on the block chain in order to improve scalability and avoid movement tracking of pseudonyms on the block chain. According to the present invention, a man-in-the-middle is not necessary. Fully automated processes from authentication to charging and billing can be provided.

A further aspect of the invention is a method for operating at least one peer-to-peer network, in particular, a previously described peer-to peer network. The peer-to peer network comprises at least one first node comprising at least one first clock module and at least a part of at least one peer-to-peer application and at least one second node comprising at least one second clock module and at least a part of the peer-to-peer application. The method comprises:

transmitting at least one first synchronization clock message from a first synchronization clock module of the first node to a second synchronization clock module of the second node via a communication connection between the first node and the second node, and synchronizing the clock signal of the second clock module to the clock signal of the first clock module based on synchronization information included in the received first synchronization clock message.

Another aspect of the invention is a first node of a peer-to-peer network, in particular, a previously described peer-to peer network. The first node comprises at least one first clock module. The first node comprises at least a part of at least one peer-to-peer application. The first node comprises at least one first communication module configured to establish at least one communication connection to at least one communication module of at least one second node of the peer-to-peer network. The first node comprises at least one first synchronization clock module configured to generate at least one first synchronization clock message. The communication module is configured to transmit the first synchronization clock message to the communication module of the second node. The first synchronization clock message comprises synchronization information configured to synchronize a clock signal of a second clock module of the second node to the clock signal of a first clock module of the first node.

A further aspect of the invention is a second node of a peer-to-peer network, in particular, a previously described peer-to peer network. The second node comprises at least one second clock module. The second node comprises at least a part of at least one peer-to-peer application. The second node comprises at least one communication module configured to receive at least one first synchronization clock message from a first node of the peer-to peer network. The second node comprises at least one second synchronization clock module configured to synchronize the clock signal of the second clock module to the clock signal of a first clock module of the first node based on synchronization information included in the received first synchronization clock message.

A still further aspect of the invention is a node of a peer-to-peer network, in particular, a previously described peer-to peer network. The node comprises at least a part of at least one peer-to-peer application. The node comprises at least one communication module configured to communicate with at least one further node of the peer-to peer network. The node comprises at least one controlling module comprising at least one detecting means configured to detect at least one operation error of the node. The controlling module comprises at least one evaluating means configured to evaluate whether the detected operation error requires a data synchronization of the data stored in the peer-to-peer application of the node. The controlling module comprises at least one initiating means configured to initiate a data synchronization action if data synchronization is required.

According to a preferred embodiment of a previously described node of the present invention, the node may comprise at least one own power supply module, in particular, in form of a battery module. Preferably, the node may comprise means for detecting an interruption of the electrical connection with an electrical supply network. In order to avoid a (longer) downtime of the node, the means for detecting the interruption can trigger, upon detection of an interruption of the connection with an electrical supply network, e.g. a switch such that the required electrical power is supplied by e.g. the at least one battery module.

According to a further embodiment of a previously described node of the present invention node may comprise means for detecting an interruption of one or more communication connection(s) to one or more further nodes. For instance, the means for detecting an interruption may detect an interruption of all communication connections to all nodes of the peer-to-peer network. Upon detecting such an interruption the node may switch to an emergency modus.

A still further aspect of the invention is a method for operating a node, in particular, the previously described node. The node comprises at least a part of at least one peer-to-peer application. The node comprises at least one communication module configured to communicate with at least one further node of the peer-to peer network. The method comprises:

detecting at least one operation error of the node, evaluating whether the detected operation error requires a data synchronization of the data stored in the peer-to-peer application of the node, and initiating a data synchronization action if data synchronization is required.

The features of the methods, systems or networks, nodes, units, modules and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
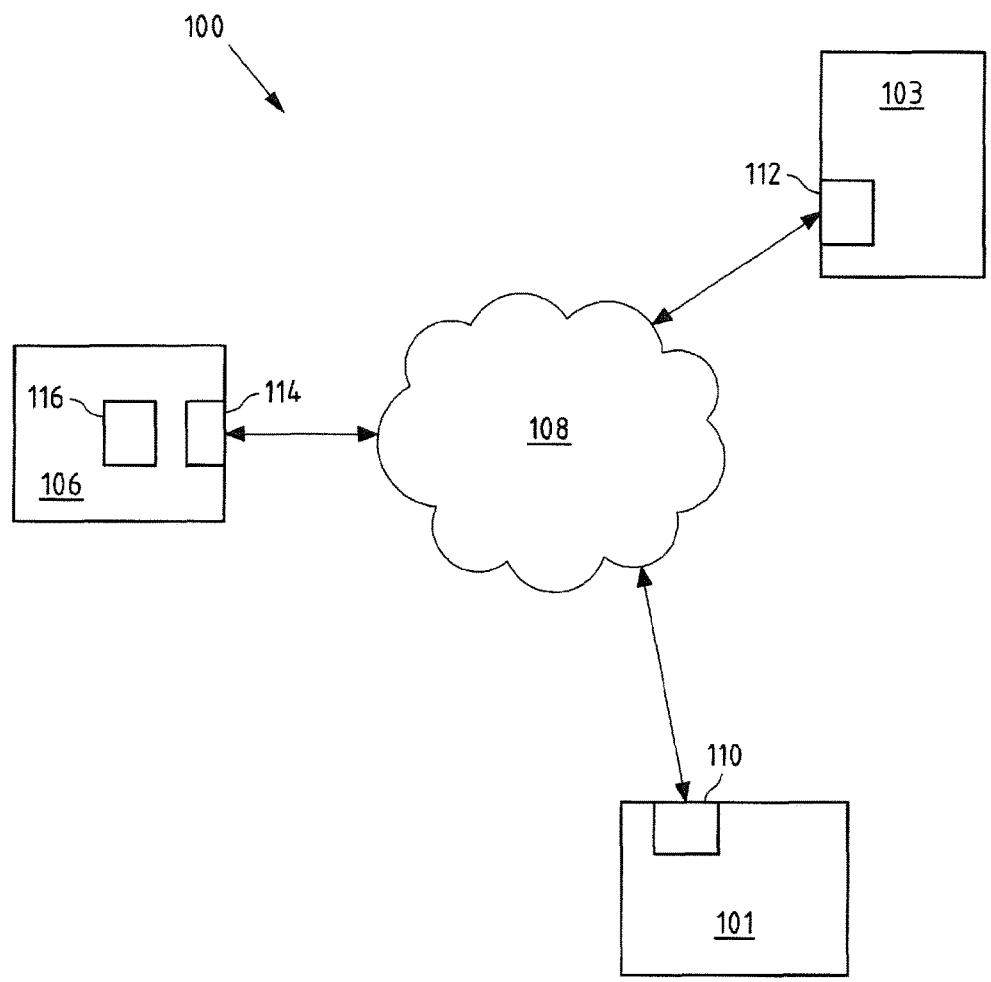
FIG. 1 shows a schematic view of an embodiment of a system according to prior art.

Like reference numerals in different figures indicate like elements.

Figure 2:
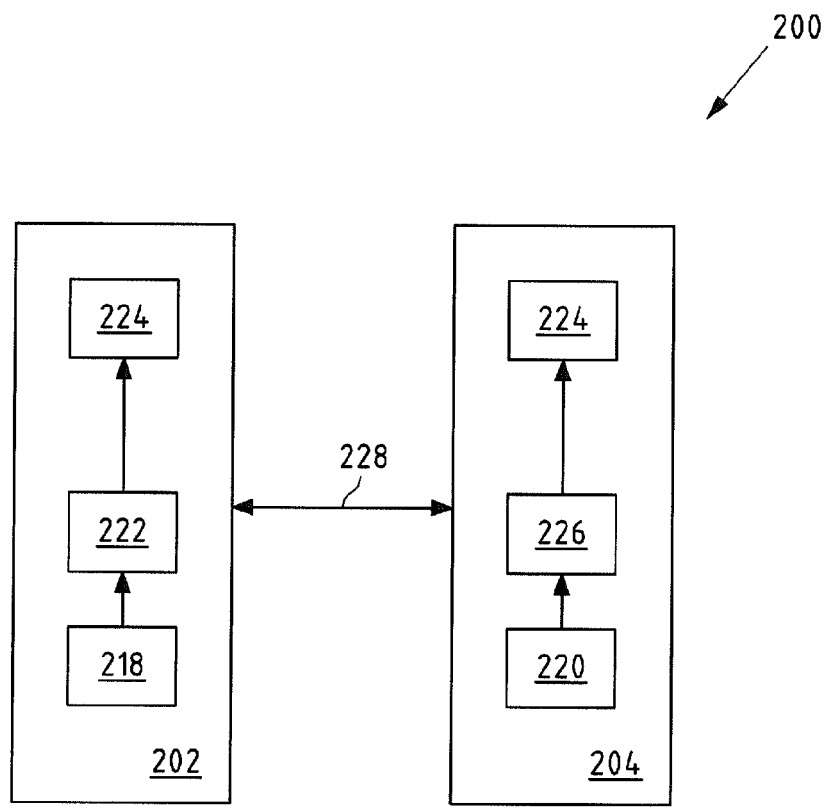
FIG. 2 shows a schematic view of a first embodiment of a peer-to-peer network according to the present invention.

FIG. 2 shows a schematic view of a first embodiment of a peer-to-peer network 200 according to the present invention. A substantial difference compared with prior art systems, such as system 100 according to FIG. 1, is that no central instance is provided.

For sake of clarity, the depicted peer-to-peer network 200 comprises (only) two nodes 202, 204. It shall be understood that a peer-to-peer network may comprise three or mode nodes. A peer-to-peer network 200 is characterized in the present case in that each node 202, 204 and/or participant is preferably connectable to every other node 202, 204 and/or participant. For instance, at least one physical standard network can be used for connection. For communicating via the at least one physical standard network, suitable communication modules may be arranged in the respective nodes. In the present case, a communication connection 228 is established between the first and second node 202, 204.

In addition, the computers 202, 204 and nodes 202, 204, respectively, have equal rights, something which distinguishes them from a server-client structure.

As can be seen from FIG. 2, a first node 202 and a second node 204 are depicted. Each node 202, 204 comprises a peer-to-peer application 224. The same peer-to-peer application 224 is preferably implemented on each node 202, 204. The peer-to-peer application 224 may preferably be a public register 224 that can, in particular, be inspected by all participants 202, 204 (not only the nodes 202, 204) of the peer-to-peer network 200. Each node 202, 204 preferably has the (entire) public register 224.

It may also be envisaged that only part of the register can be provided on a node (light node]. In a particularly preferred embodiment, the peer-to-peer application 224 may be a block chain 224 which will be explained in more details hereinafter.

Further, the first node 202 comprises a first clock module 222 configured to provide an (internal] clock signal for the first node 202. In addition, the first node 202 comprises a first synchronization clock module 218. The second node 204 comprises a second clock module 226 configured to provide an (internal] clock signal for the second node 204. What is more, the second node 204 comprises a second synchronization clock module 220.

A (time or clock) synchronization process among the nodes 202, 204 can be conducted as follows. The first synchronization clock module 218 may generate a synchronization information e.g. based on the clock signal of the first clock module 222. In particular, the synchronization information is suitable to synchronize a further clock signal to the clock signal of the first node 202. The first synchronization clock module 218 can cause transmission, e.g. by means of a communication module, of a first synchronization clock message comprising said synchronization information to the second node 204 via the communication connection 228.

Upon receipt of the first synchronization clock message e.g. via a communication module of the second node 204, at least the synchronization information included in the message can be provided to the second synchronization clock module 220. The second synchronization clock module 220 may evaluate the received synchronization information and may synchronize the clock signal of the second clock module 226 based on said information. In particular, if the synchronization information indicates that there is a clock offset and/or phase offset between the clock signal of the first node 202 and the clock signal of the second node 204, the second synchronization clock module 220 may adjust the clock signal of the second module such that an offset is at least reduced.

In a further embodiment, a peer-to-peer application transaction is triggered by a decentral application (Dapp) running on a node 202, 204 which requires high accuracy of the time when the transaction was triggered. This time information will be stored in the peer-to-peer application 224 in order to put transactions into a (specific) time sequence (e.g. in case of trading applications). In order to avoid manipulation of time data and to ensure accuracy, the transaction is time stamped and immediately sent (propagated) to surrounding peers.

In addition, the peer-to-peer application 224 may trigger the clock synchronization modules 218, 220 to send a time synchronization message at the same time to the surrounding nodes and/or other peers, such as previously described further unit(s). Surrounding nodes can check the validity of the time stamp of a transaction by comparing the time stamp with their own clock module. The time synchronization message received by the first node 202 and/or propagation time delays may be measured before. Surrounding nodes can now validate the timestamp of the transaction. They can confirm the time stamp or—depending on a peer-to-peer application protocol—adjust the timestamp following a consensus principle. Surrounding nodes might propagate the transaction to further nodes for further time stamp validation. In a further embodiment, the number or distribution of nodes for time stamp validation can be controlled via a time stamp validation protocol. Transaction and its validated time stamp are then stored in the peer-to-peer application 224. The consensus protocol of the peer-to-peer application 224 may use the time stamps to place transactions in a chronological order The peer-to-peer application 224 might validate the transaction in e.g. a later step based on their chronological order. It should be understood that the validated time stamp created by above described method can also be used for off-chain computing and/or transaction processing including payment or state channel networks. The here described node can be a node of a payment or state channels network as well.

Figure 3:
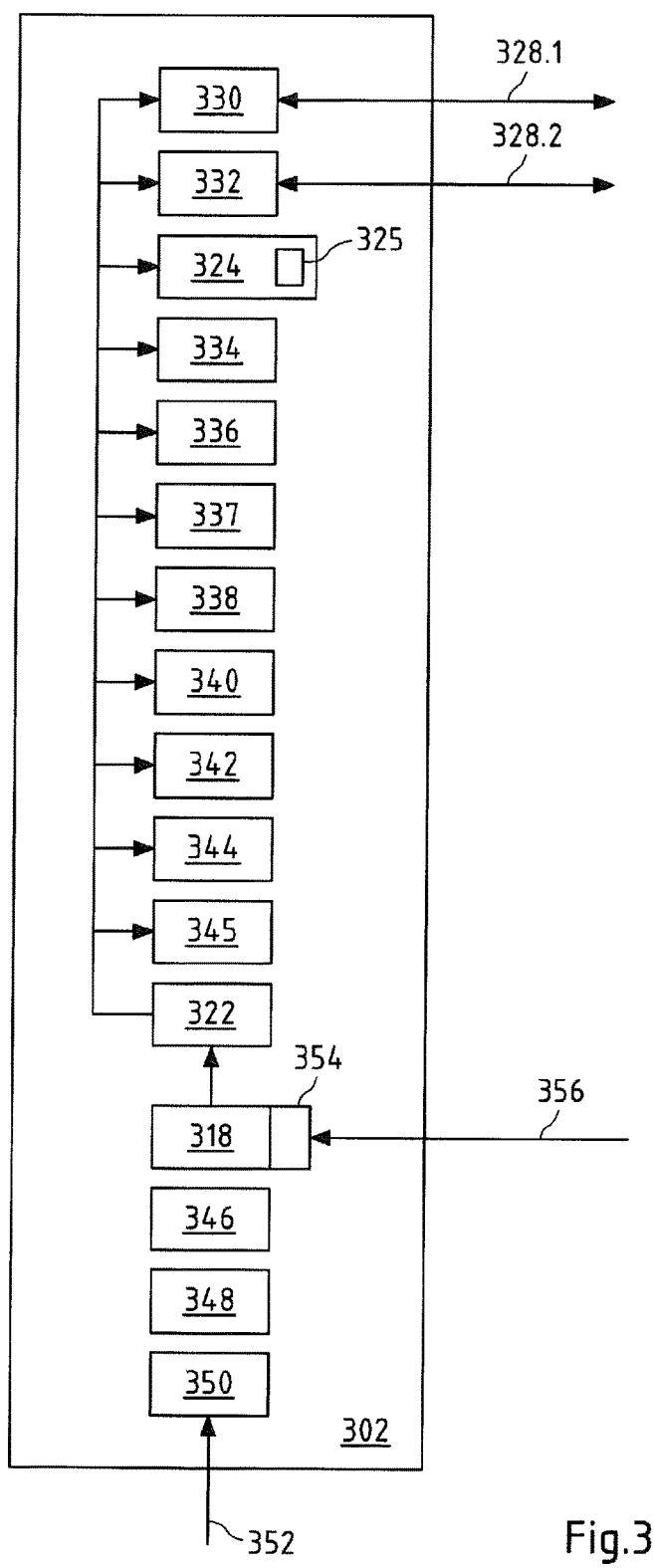
FIG. 3 shows a schematic view of an embodiment of a node according to the present invention.

FIG. 3 shows a schematic view of an embodiment of a node 302 according to the present invention. The node 302 may be a first node 302. As can be seen from the depicted node 302, the node 302 comprises a plurality of modules 324 to 350. A module 324 to 350 may be formed by software and/or hardware means. It shall be understood that at least a part of the depicted modules are only optional modules.

The depicted node 302 comprises two (first) communication modules 330, 332. For instance, a LAN communication module 330 configured to establish at least one LAN communication connection 328.1 (e.g. to a further node) and a WAN communication module 332 configured to establish at least one WAN communication connection 328.2 (e.g. to a further node) can be provided. According to other variants, there may be further or other communication module(s), such as a M2M (machine to machine) communication module (e.g. UMTS), a SAN (storage area network) communication module, a field bus module, a long range (LoRa) communication module (LoRa), a ZigBee communication module, RS485 communication module, etc. A further module may be a watchdog timer module. A communication module may be configured for tamper-proof communication and/or for a pool of further units, such as (surrounding) sensor(s) and/or actor(s). It shall be understood that one or more communication module(s) might be redundant (i.e. there are two or more ((DC) LAN) communication modules per node and/or a cluster of nodes is sharing two or more external WAN or internet communication links) in order to ensure a high service level and/or availability for the communication.

Furthermore, the node 302 comprises a peer-to-peer application 324. Data 325, such as one or more authorization criterion(s) 325, can be stored in the peer-to-peer application 324. In order to access data 325 stored on the node 302 and in the peer-to-peer application 324, a peer-to-peer module 334 (e.g. comprising a suitable API) can be provided. Further, a controlling module 336 configured to control one or more (internal) process of the node 302 may be provided.

Further modules 338, 340, 342, 344 of the node 302 may be a Trusted Execution Environment or a Software Guard Extension (SGX) module 338, a Trusted Platform Module (TPM) 340, an operating system (OS) module 342 and a hardware (HW) module 344. It shall be understood that either the Trusted Execution Environment or the Trusted Platform Module may hold unique cryptographic key(s) that provide a unique identification of the node. In case a node is manufactured one or more of said key(s) may be used to establish a private/public key pair in a node registration process. This may lead to a unique identification of a node that cannot be duplicated. This identification may be registered in the peer-to-peer network as a (very first) step in a node manufacturing process. This means one of the very first parts of the node is a Trusted Execution Environment or the Trusted Platform Module which can be understood as a trusted core of the product. An identification is being generated, stored in the peer-to-peer application and a digital product memory is set-up for this specific node. During a manufacturing process of a node all other physical component may build activities and software and/or data deployment or configuration activities of the node are executed after the trusted core is registered in the peer-to-peer application. All manufacturing, software and/or data deployment, quality assurance, configuration and logistics activities are stored in the digital product memory in the peer-to-peer application.

It shall be understood that a hardware module might include a special designed accelerator unit in order to accelerate processing of cryptographic algorithms (e.g. hashing, mining, zero knowledge proof creation, etc.).

In addition, the depicted node 302 comprises a first clock module 322 configured to generate and provide an internal clock signal. Arrows indicate that the clock signal can be provided to one or more modules. It shall be understood that according to other variants further modules or less modules can be provided with the clock signal.

In addition, the node 302 comprises a first synchronization clock module 318. The first synchronization clock module 318 comprises input means 354 configured to receive from an (external) source 356 a master clock message comprising a master time signal. The first synchronization clock module 318 may be configured to synchronize the first clock module 322 based on the received master time signal. In addition, a synchronization information can be created by the first synchronization clock module 318 based on the received master time signal.

Further, at least every first synchronization clock message to be sent by the first node 302 may be signed with a unique signature of the first node 302. In particular, a signing module 337 may be configured to provide each message with said signature.

The depicted node 302 comprises also an (internal) energy management module 346, an uninterruptible power supply [USV] module 348 [e.g. a battery) and a power supply module 350 connected with an electrical supply grid 352. The USV module 348 may be an electrical apparatus 348 that provides emergency power to the node 302 when the power supply module 350 fails. For instance, the energy management module 346 may comprise means to detect an interruption of the connection to the electrical supply grid 352 and/or another failure of the power supply module 350.

Further, the controlling module may be configured for trusted execution environments and/or for pool of trusted computing environments, and/or for software and/or data deployment, and/or for clustered computing, and/or for load balancing and/or for virtualization.

Moreover, the depicted node 302 comprises a physical and/or digital intrusion detection module 345. This module 345 may have a communication connection with the controlling module 336 in order to inform the controlling module about a potential intrusion of the node 302. A physical intrusion may be detected via a sensor that monitors physical attack(s) on a sealed housing or cabinet of the node 302. The housing and/or cabinet of the node 302 may be physically reinforced to prevent intrusion or at least make them more difficult. A digital intrusion detection sensor may monitor and/or log the network traffic to identify an attacker. Parameter(s) for intrusion detection might be deployed and or controlled by the peer-to-peer application 324.

Figure 4:
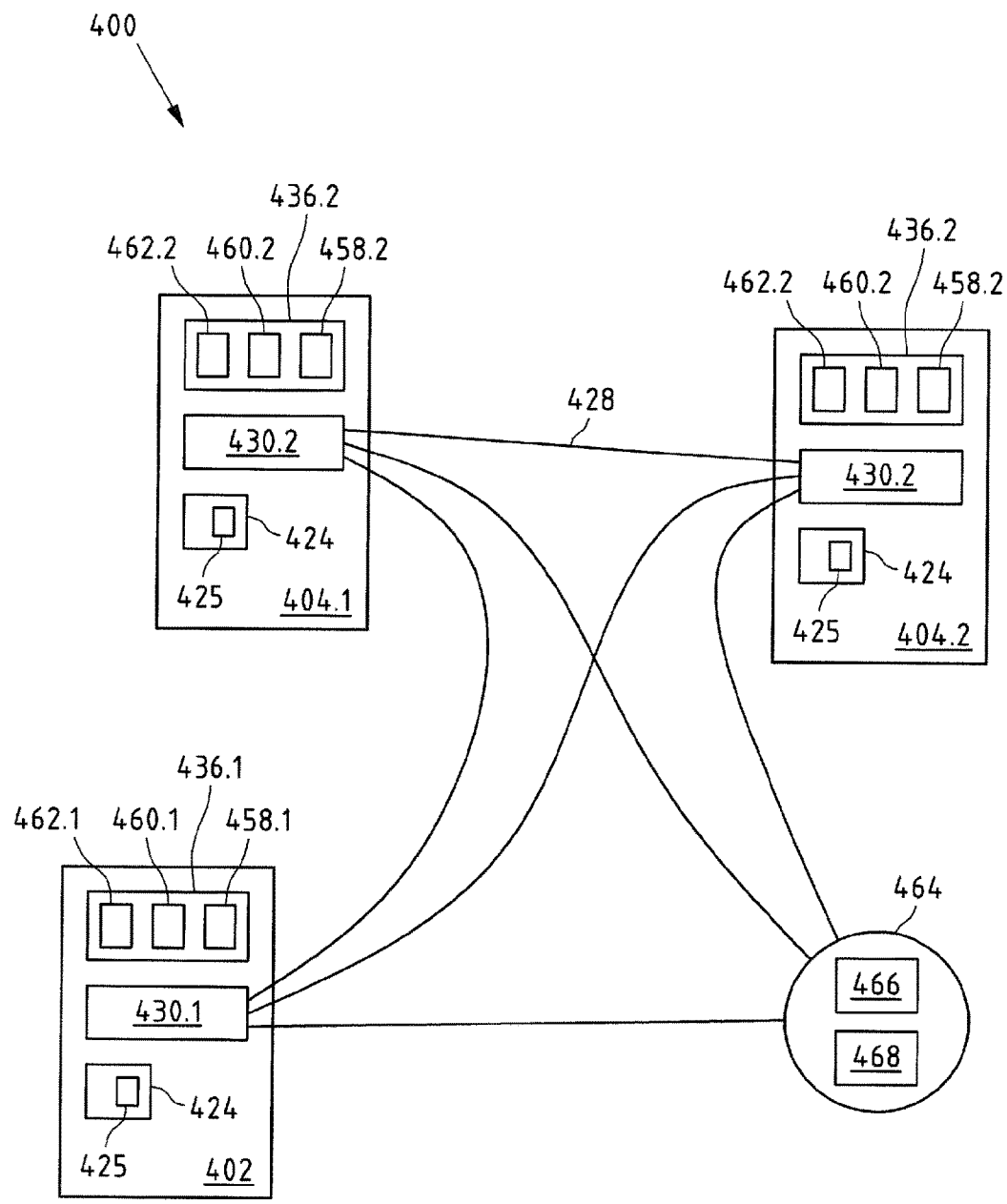
FIG. 4 shows a schematic view of a further embodiment of a peer-to-peer network according to the present invention.

FIG. 4 shows a further embodiment of a peer-to-peer network 400 according to the present invention. The depicted peer-to-peer network 400 comprises three nodes 402, 404.1, 404.2. For instance, two second (slave) nodes 404.1, 404.2 and one first (master) node 402 can be provided. However, in the present embodiment, it is not necessary that the nodes 402, 04.1, 404.2 are capable of conducting the above described time synchronization process.

The first node 402 comprises a first controlling module 436.1, at least one first communication module 430.1 and a peer-to-peer application 424. The peer-to-peer application 424 may comprise one or more authorization criterion(s) 425. Preferably, each of the node 402, 404.1, 404.2 comprises the same peer-to-peer application 424 with said one or more authorization criterion(s) 425.

The first controlling module 436.1 comprises first detecting means 458.1, first evaluating means 460.1 and first initiating means 462.1.

Similar to the first node 402, also each depicted second node 404.1, 404.2 comprises a second controlling module 436.2 comprising second detecting means 458.2, second evaluating means 460.2 and second initiating means 462.2. These first and second modules and first and second means, respectively, may function at least in a similar way.

In addition, a communication network controlling unit 464 (e.g. a software-defined networking controlling unit) comprising a bandwidth allocation module 466 and a peer-to-peer module may be provided. The communication network controlling unit 464 may be configured to manage the data traffic of at least a part of the communication connection(s) of the peer-to-peer network 400. In particular, the communication network controlling unit 464 is configured to allocate available bandwidth to one or more communication connection(s) of the peer-to-peer network 400.

Figure 8:
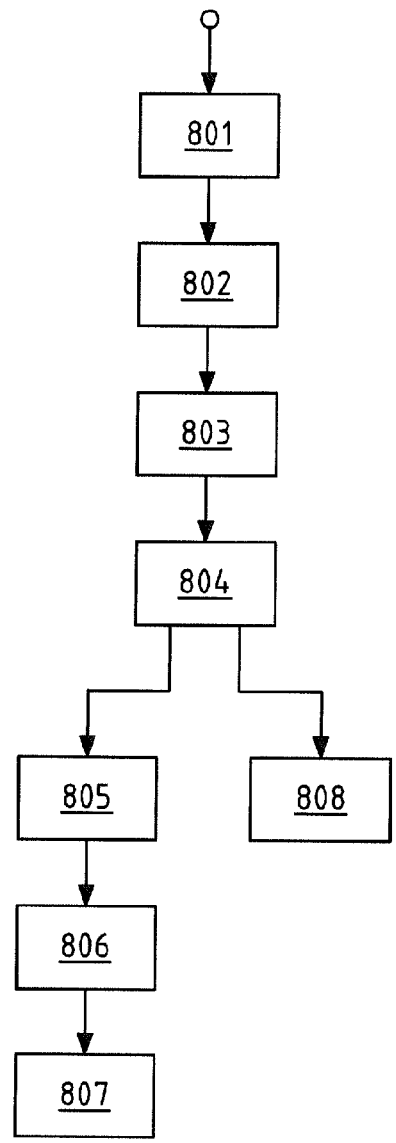
FIG. 8 shows a diagram of a further embodiment of a method according to the present invention.

The functioning of a node 402, 404.1, 404.2 and/or the peer-to-peer network 400 will be described with the aid of FIG. 8.

In a first step 801, e.g. node 404.2 may detect, by using the detecting means 458.2, that an operation error of the node 404.2 has occurred. By way of example, the detecting means 458.2 detect a reboot process of the node 404.2. Such a reboot process may be an (indirect) indication of a previously occurred operation error, such as a power outage or a communication connection interruption with the other nodes 402, 404.1 of the peer-to-peer network 400.

In a next step 802, the evaluating means 460.2 check whether a data synchronization of the data stored in the peer-to-peer application 424 and on the node 404.2 is required. Preferably, each data (set) stored in the peer-to-peer application 424 may be associated with a time stamp. The evaluating means 460.2 may compare the time stamp of the last stored data with the current time. If, e.g. the determined time period between said time stamp and the current time exceeds a preset threshold period, the evaluating means 460.2 may come to the result that data synchronization is required. It may also possible that it is predefined that data synchronization will be conducted each time a reboot process (or another operation error or indication of an operation error) is detected. In particular, the detecting of an operation error may include the evaluating result that data synchronization is required.

Upon the detection of the necessity of data synchronization, in a next step 803 the initiating means 462.2 may initiate the data synchronization process by transmitting a data synchronization indication to the communication module 430.2 of the node 404.2.

Preferably, directly upon receipt of the data synchronization indication the communication module 430.2 may start/trigger one or more data synchronization action(s) (step 804). As a first data synchronization action, the communication module 430.2 may be configured to transmit a data synchronization request message to at least one further node 402, 404.1 of the peer-to-peer network 400. Preferably, the communication module 430.2 transmits said message to the directly neighbored node 404.1 via the (shortest) communication connection 428.

In addition, in order to accelerate the data synchronization process the communication module 430.2 of the node 404.2 may provide, as a further data synchronization action(s), the data synchronization request message with a priority information (e.g. a flag) and/or may transmit at least one bandwidth allocation request message to the communication network controlling unit 464.

The data synchronization request message may comprise information which enables a further node 404.1 to detect which data of the peer-to-peer application 424 should be transmitted to the requesting node 404.2 in order to synchronize the datasets. For instance, the communication module 430.2 of the requesting node 404.2 may include the time stamp of the last stored data (set) into the data synchronization request message.

In step 805, the further node 404.1 may receive the data synchronization request message. A priority information associated with said message may cause that the further node 404.1 may use at least a main part of its processing power for conducting the data synchronization process. Thereby, the further node 404.1 may check, e.g. by evaluating a signature (of the requesting node 404.2) of the data synchronization request message, whether the requesting node 404.2 is entitled to request the data synchronization and/or to prioritize said process.

In particular, upon receipt of the data synchronization request message, the further node 404.1 may evaluate said data synchronization request message and may determine the data which must be transmitted to the requesting node 404.2 for data synchronization. For instance, all data sets which have been stored after said transmitted time stamp may be transmitted (in step 806) to the requesting node 404.2. Preferably, each data packet to be sent can be associated with a priority information by the communication module 430.2 of node 404.1.

Upon receipt of the data packet(s) from the further node 404.1 the requesting node 404.2 may update its data of the peer-to-peer application (step 807).

If also a bandwidth allocation request message is sent to the communication network controlling unit 464, e.g. in parallel to steps 804, 805, 806, 807, in step 808, the bandwidth allocation module 466 of the communication network controlling unit 464 may increase the bandwidth of the communication connection 428 between the node 404.2 and the further node 404.1. The bandwidth allocation request message may comprise an identification of the communication connection 428 whose bandwidth should be increased.

Prior to increasing the available bandwidth of the communication connection 428 the communication network controlling unit 464 may check whether the requesting node 404.2 is actually entitled to request an increase of the bandwidth of said connection 428. Preferably, the bandwidth allocation module 466 may be configured to check upon receipt of the bandwidth allocation request message at least one preset authorization criterion.

Preferably, for conducting said check the communication network controlling unit 464 may comprise a peer-to-peer module 468 at least configured to read one or more preset authorization criterion(s) 425 stored in the peer-to-peer application 424. For instance, it can be checked whether a signature (or other unique identification of the requesting node 404.2) corresponds to a preset authorization criterion 425. If there is a match, the bandwidth allocation module 466 may increase the available bandwidth of the communication connection 428 (e.g. in accordance to preset rules). Otherwise, the bandwidth allocation module 466 may not increase the bandwidth.

After the entire data has been synchronized the bandwidth of the connection 428 can be reset and the nodes 402, 404.1, 404.2 and/or the peer-to-peer network can be further operated according to a regular modus.

It shall be understood that the previously described method step can be conducted in another order and/or at least some steps can be performed in parallel. For instance, prior to or parallel to the transmission of the data synchronization request message the bandwidth allocation request message may be sent.

Besides data synchronization it may also be detected that a clock synchronization is required. Then, as previously described, e.g. a pre-synchronization process and a transmission of a first synchronization clock message can be conducted. This process can be preferably conducted prior to the data synchronization process.

Figure 5:
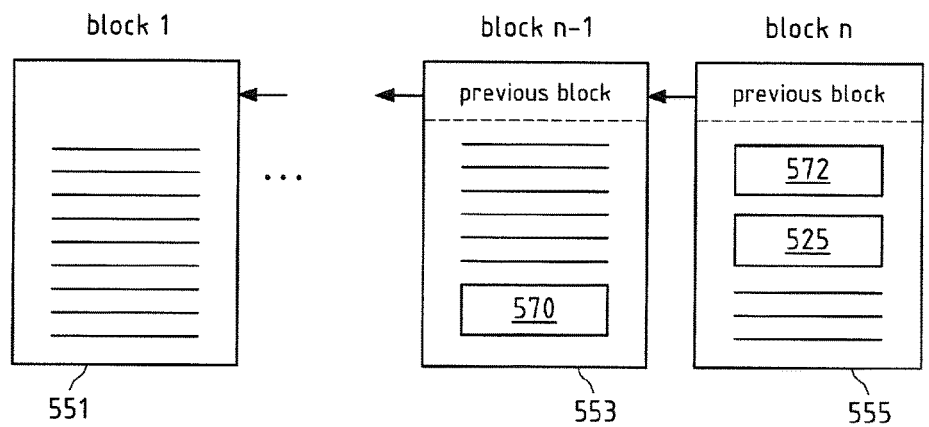
FIG. 5 shows a schematic view of an embodiment of a peer-to-peer application according to the present invention.

FIG. 5 shows a schematic view of an embodiment of a peer-to-peer application 524 according to the present invention. The peer-to-peer application 524 may be implemented on a previously described node.

The depicted peer-to-peer application 524 is a register readable, in particular, by the participants of the peer-to-peer network. Thereby, data e.g. in form of messages can be written and/or read into/from the register 524 by a peer-to-peer module of an entity and/or any other participants in the peer-to-peer network. In a preferred embodiment, the peer-to-peer application 524 may be a block chain 524.

It shall be understood that one or more block chains can run on a node. Data can be exchanged via the block chains via interfaces or smart contracts.

Hereinafter, it is assumed in the following description of the present embodiment that the at least one peer-to-peer application 524 is a block chain 524. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application, the block chain can be a permissionless or permissioned block chain. In a specific case the block chain can be public, consortium or private block chain. Or it can be a combination of block chains.

In a further embodiment, the peer-to-peer application can be formed with multiple block chains which are connected via mechanisms such as side chains or smart contracts.

The block chain 524 is formed by at least one block 551, 553, 555, preferably by a plurality of interconnected blocks 551, 553, 555. The first block 551 may also be called genesis block 551. As can be seen, a block 553, 555 (except for the first block 551) refers to each previous block 551, 553. A new block can be created by a computationally intensive process (for example, so called "mining" or through another appropriate process, such as voting] and will be particularly provided to all participants of the peer-to-peer network.

The present block chain 524 may be adapted to receive data/messages from a peer-to-peer module of e.g. a vehicle, machine, user terminal and/or from another peer-to-peer device/unit of another participant of the peer-to-peer network. Further, block chain 524 is particularly adapted to save these data/messages in the block chain 524. Furthermore, the block chain 524 is configured to generate data/messages e.g. based on a validation process and/or caused by a peer-to-peer module.

In particular, a (newly) received message can be saved and published in the current block 555 of the block chain 524. Due to the configuration of a block chain 524 as a public register 524, said data message of e.g. a peer-to-peer module of an entity can be read by preferably all participants of the peer-to-peer network. Alternatively or additionally, data of the message may be stored on a decentral file service or distributed block chain database.

In the present block chain 524 different types of messages and data, respectively, for example, within a smart contract (algorithm and/or storage at the block chain 524) can be processed and/or stored. By way of example, the message 570 comprises a transaction agreement 570. For instance, two entities can cause the generation of a specific transaction agreement 570 e.g. about the conduction of an action or the like. For instance, a transaction agreement can comprise a first action to be conducted by a first entity of the transaction agreement 570 and e.g. after fulfilling said first action, a further action must be performed, such as financial action (e.g. an amount of cryptocurrency e.g. per time unit has to be transferred e.g. by means of the peer-to-peer application 524] between the first entity and a further entity of the transaction agreement 570.

Further data stored in the peer-to-peer application may be one or more authorization criterion(s) 525, as previously described. For instance, to become a node of the peer-to-peer network, a node has to conduct a registering process. The process can be initiated by a new node by e.g. transmitting a registration request message. Upon a successful registration, an authorization criterion 525, such as a (newly generated) peer-to-peer identification of the new node can be stored in the peer-to-peer application 524.

Prior to the registration of a node, at least part of the already existing nodes of the peer-to-peer network may check whether the registering requirements predefined by the peer-to-peer network are met by the node requesting registration. In order to perform the check, preferably, further data may be included in the registering message. In particular, the nodes of the peer-to-peer network may provide registering rules or registering requirements which must be fulfilled by a new node to be regarded as a trustful node. By way of example, each node to be registered must comprise an account and/or a particular amount of a cryptocurrency or must fulfil specific technical requirement(s), such as a minimum processing power, a specific (hardware and/or software) infrastructure, etc. Other rules/requirements may be individually defined by the nodes of a peer-to-peer network. E.g. it may be necessary that a new node must be recommended by a node which is already a participant of the peer-to-peer network.

Also a further unit, such as a sensor and/or actor, can be registered in the peer-to-peer application in a similar way, as described above. For instance, the unique peer-to-peer identification can be registered and stored in the peer-to-peer application or a database controlled by the peer-to-peer application. Further, during the registering process, further data can be stored. For instance, at least one previously described (updateable) technical specification data set of the further unit can be stored in the peer-to-peer application or a database controlled by the peer-to-peer application together with said unique peer-to-peer identification of the further unit. Moreover, during an assignment step, the further unit can be assigned to one or more node(s) of the peer-to-peer network. Also this assignment can be stored during the registration process in the peer-to-peer application or a database controlled by the peer-to-peer application e.g. together with said unique peer-to-peer identification of the further unit and/or the unique identification(s) of the respective node(s). It shall be understood that some of the data can also be stored after the registration process.

Further exemplified data may be a smart contract 572 comprising code which is executed by a node upon receipt of a specific message.

Data will be stored either on the block chain, in a decentral file system (IPFS) or in a distributed block chain database (BigchainDB] or a cloud database.

It shall be noted that separate peer-to-peer applications, such as two or more block chains, can exist for different peer-to-peer networks.

Preferably, at least the above described messages, such as the agreements and other messages, can be hashed together in pairs in a block of the block chain by a Merkle tree. In particular, only the last hash value, the so-called root hash, is noted as a checksum in the header of a block. Then, the block can be coupled with the previous block. Chaining of the blocks can be performed using this root hashes. Each block can include the hash of the entire previous block header in its header. This makes it possible to clearly define the order of the blocks. In addition, this may also prevent the subsequent modification of previous blocks and the messages stored in the previous blocks, since, in particular, the hashes of all subsequent blocks would have to be recalculated in a short time.

In addition, data feeds can be provided by the peer-to-peer application [so called smart oracles, e.g. master time information).

Figure 6:
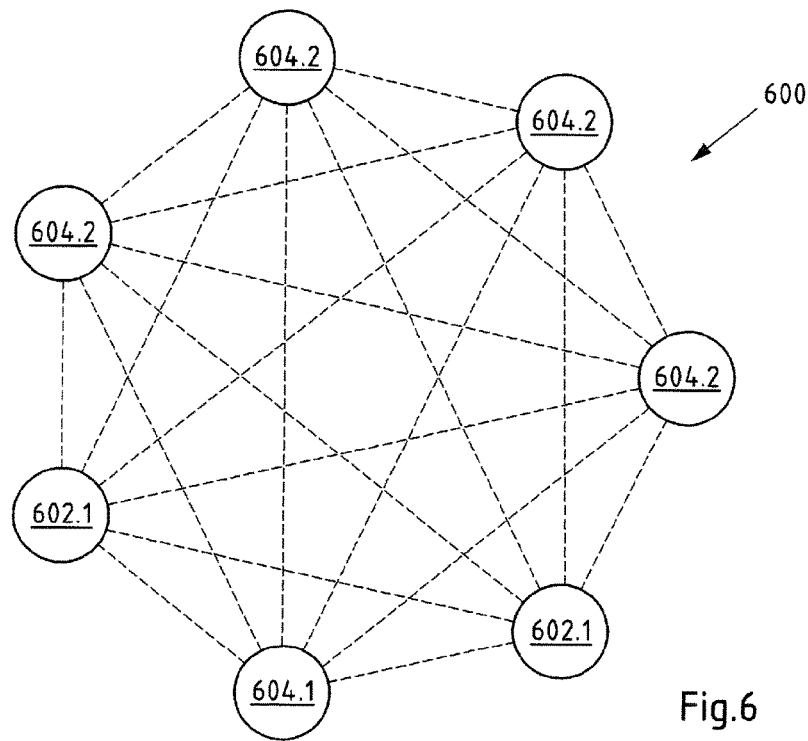
FIG. 6 shows a schematic view of a further embodiment of a peer-to-peer network according to the present invention.

FIG. 6 shows a schematic view of another embodiment of a peer-to-peer network 600 of the invention. In the present embodiment, only nodes and/or participants 602.1, 604.1, 604.2 of the peer-to-peer network 600 are shown. In the present example, it is assumed that all nodes 602.1, 604.1, 604.2 comprise at least a part of the peer-to-peer application (not shown).

As can be seen, two different types of peers or node computers 602.1, 604.1 and 604.2 are presently illustrated. All nodes 602.1, 604.1, 604.2 are comprised by the peer-to-peer network 600. In the present embodiment, however, only a part of the nodes 602.1, 604.1, 604.2, in the present case, the peers 602.1, 604.1, check the validity of the data stored in the peer-to-peer application messages, such as the transaction agreements, authorization criterions, and the like. Furthermore, only a part of the entire nodes can be configured to store the peer-to-peer application and/or only a part of the nodes can be configured to execute the algorithms of a smart contract. Since the validation/verification of e.g. identification data requires a considerable computational effort, it may be advantageous for reasons of efficiency, if only a part of the nodes 602.1, 604.1, especially particularly powerful nodes 602.1, 604.1, perform the validation and/or optimization algorithms.

Validation and optimization can be done on-chain or off-chain. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the 602.1, 604.1 comes to a positive result. It shall be understood that only a single, especially particularly powerful node can perform the validation and/or optimization process.

Similarly, in an alternative (not shown) embodiment a particularly large peer-to-peer network may be divided in two or more clusters. In a corresponding peer-to-peer network, for example, a validation (of a subset of transactions) may only be carried out by the members of one cluster (subset of nodes, e.g. sharding of a block chain to improve the scalability). In a further embodiment the peer-to-peer application can be formed using multiple block chains. These block chains are connected via frameworks such as sidechains or smart contracts.

Figure 7:
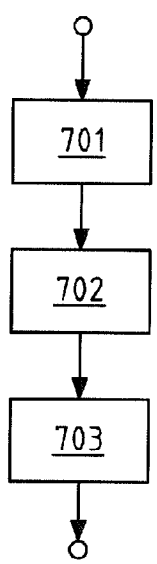
FIG. 7 shows a diagram of an embodiment of a method according to the present invention.

FIG. 7 shows a diagram of an embodiment of a method according to the present invention. The method can be in particular performed by a peer-to-peer network, such as the peer-to-peer network 200 shown in FIG. 2.

In a first (optional) step 701, a pre-synchronization process can be conducted. In this step, pre-synchronization messages can be exchanged between a first synchronization clock module and a second synchronization clock module. The first synchronization clock module may send a first pre-synchronization message comprising a first time marker to the second synchronization clock module. The second synchronization clock module determines the reception time point of the first pre-synchronization message based on the clock signal of the second node. Further, the second synchronization clock module may send a second pre-synchronization message comprising a second time marker to the first synchronization clock module. The first synchronization clock module determines the reception time point of the second pre-synchronization message based on the clock signal of the first node.

In addition, the first and/or second synchronization clock module may respond to a received pre-synchronization message by sending further pre-synchronization message comprising as timer markers the respectively determined reception time points. Based on the four time markers the first node-to-second node delay and the second node-to-first node delay can be determined. Preferably, the mean value of the determined delay can be calculated and used to generate the synchronization information to be used to synchronize the clock signal of the second node.

In a next step 702, a first synchronization clock message comprising synchronization information is transmitted from the first synchronization clock module to the second synchronization clock module.

Then, in step 703, upon receipt of the first synchronization clock message, the second synchronization clock module synchronizes the clock signal of the second clock module to the clock signal of the first clock module based on the synchronization information included in the first synchronization clock message.

Figure 9:
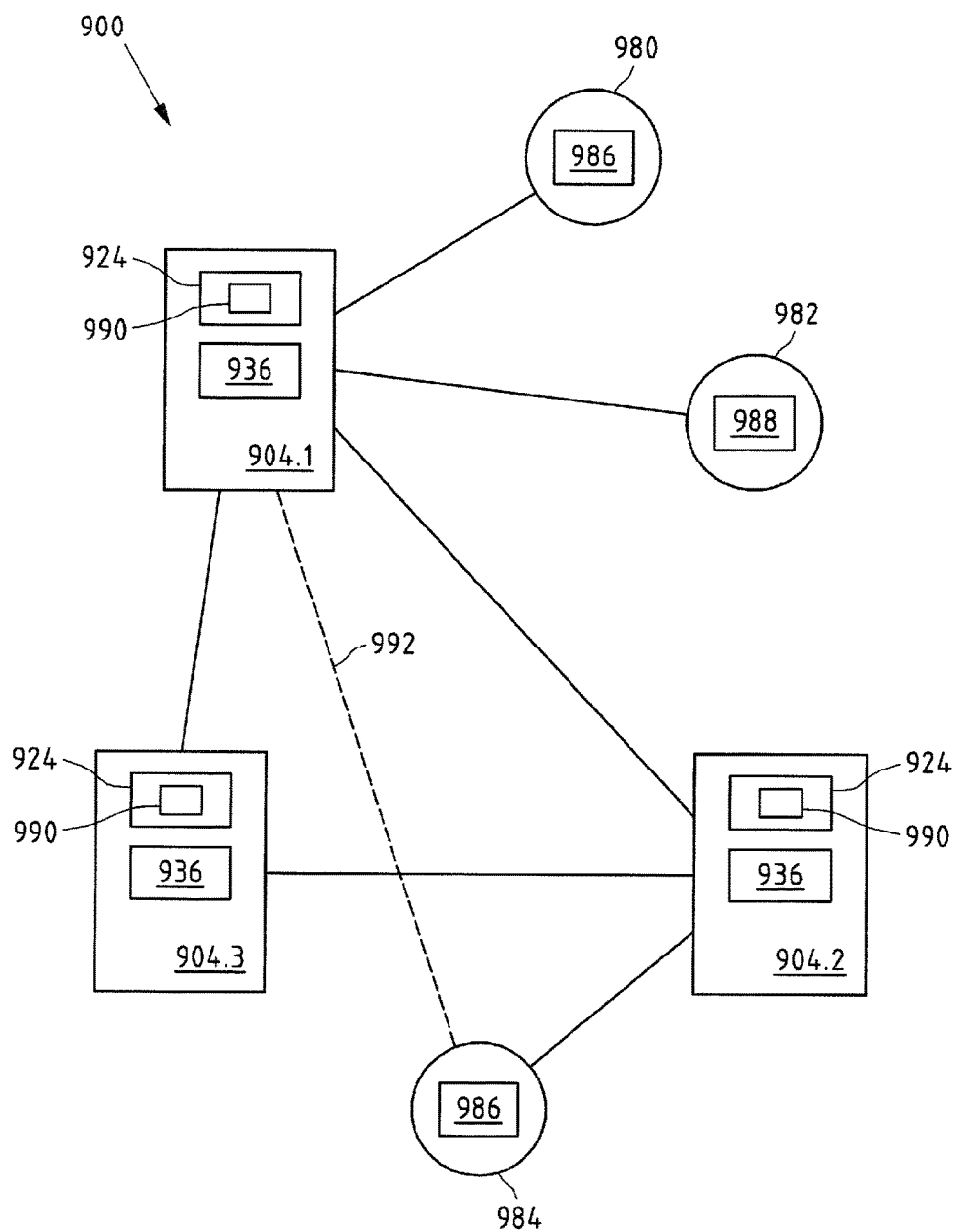
FIG. 9 shows a schematic view of a further embodiment of a peer-to-peer network according to the present invention.

FIG. 9 shows a further embodiment of a peer-to-peer network 900 according to the present invention. The depicted peer-to-peer network 900 comprises three nodes 904.1, 904.2, 904.3. There may be further nodes. The nodes 904.1, 904.2, 904.3 may have communication connections to each other formed by one or more standard network(s). As described hereinbefore, each node may comprise a controlling module 936 and the peer-to-peer application 924.

In addition, the peer-to-peer network 900 comprises three further units 980, 982, 984. There may be more or less further units. Two of the further units 980, 982, 984 may be sensors 980, 984 and one further unit 982 may be an actor 982. A further unit 980, 982, 984 may comprise a signing module 986 or a peer-to-peer module 988 comprising a signing module. Each further unit 980, 982, 984 may be configured to communicate with at least one node 904.1, 904.2, 904.3.

Preferably, each of the further units 980, 982, 984 is registered in the peer-to-peer application 924. In the present example, at least the respective unique peer-to-peer identifications of the further units 980, 982, 984 are stored in a register portion 990 of the peer-to-peer application 924. Further, technical specification data sets of the respective further units 980, 982, 984 are stored in the register portion 990 of the peer-to-peer application 924.

What is more, in the present example, each of the further units 980, 982, 984 may be assigned to a specific node 904.1, 904.2, 904.3. In the present example, the further unit 980 is assigned to the node 904.1, the further unit 982 is assigned to the node 904.1 and the further unit 984 is assigned to the node 904.2. Said unambiguous assignments may be also stored in the register portion 990 of the peer-to-peer application 924. It shall be understood that according to other variants of the present invention, at least part of the data can be stored at another storage location, such as in a database controlled by peer-to-peer application or in another portion of the peer-to-peer application.

The functioning of the peer-to-peer network 900 will be described hereinafter. For instance, the sensor 980 has measured data. The measured data can be transmitted to the node 904.1 assigned to said sensor 980 e.g. by sending a message (e.g. in form of one or more data packets). Prior to transmitting e.g. one or more messages, each message can be signed by the signing module 986 of the sensor 980.

Upon receipt of the message, at least the receiving node 904.1 evaluates the correctness of the received message by checking in particular the signature of the received message. In particular, by means of the peer-to-peer application 924 and the stored unique peer-to-peer identification(s) and the assignment(s) at least the receiving node 904.1 can validate the correctness of the received message. In other words, it can be checked whether the message was manipulated and/or whether the sending further unit 980 has a malfunction or the like.

For instance, the signature (based on the unique identification of the sensor 980) can be compared with the stored identifications. If there is a match, it can be further checked whether the receiving node 904.1 is actually assigned to the sensor 980. If also the assignment is correct, the message may be further processed. For instance, if the sensor 986 transmits via the communication connection 992 a message, the node 904.1 may recognize that the sensor 984 is not assigned to the node 904.1, and thus, the message will not be further processed by the node 904.1.

In addition and prior to processing the data of a received message, the received data can be evaluated. It can be checked (e.g. by a comparison process) by means of the stored technical specification data set whether the received data is characteristic for the sending sensor 980. If the data is actually characteristic for the sending sensor, the data may be further processed (e.g. evaluated, stored and/or forwarded). Otherwise, the node 904.1 may initiate proper actions. It shall be noted that at least one of the depicted nodes 904.1, 904.2, 904.3 may be formed as a previously described first node or second node.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A peer-to-peer network, comprising:
   at least one first node comprising at least one first clock module and at least a part of at least one peer-to-peer application,
   at least one second node comprising at least one second clock module and at least a part of the peer-to-peer application,
   wherein at least one communication connection between the first node and the second node is establishable,
   wherein the first node comprises at least one first synchronization clock module,
   wherein the second node comprises at least one second synchronization clock module,
   wherein at least the first synchronization clock module is configured to transmit at least one first synchronization clock message to the second synchronization clock module via the communication connection,
   wherein the second synchronization clock module is configured to synchronize the clock signal of the second clock module to the clock signal of the first clock module based on synchronization information included in the first synchronization clock message,
   wherein the first node comprises a first signing module configured to sign the first synchronization clock message with a signature, and
   wherein the signature of the first synchronization clock message is validated by two or more nodes of the nodes of the peer-to-peer network.

2. The peer-to-peer network according to claim 1, wherein only if the two or more nodes come to a positive result, the signature is valid.

3. The peer-to-peer network according to claim 1,
   wherein the first synchronization clock module is a master synchronization clock module,
   wherein the master synchronization clock module comprises an input means configured to receive at least one master synchronization clock message comprising a master time signal, and
   wherein the synchronization information included in the first synchronization clock message is at least based on the master time signal.

4. The peer-to-peer network according to claim 1, wherein the first synchronization clock message comprises synchronization information for adjusting a clock offset and/or a phase offset of the clock signal of the second clock module compared to the clock signal of the first clock module.

5. The peer-to-peer network according to claim 1, wherein the first synchronization clock module is configured to determine the synchronization information included in the first synchronization message depending on a delay information derived from a previous exchange of at least two pre-synchronization messages between the first synchronization clock module and the second synchronization clock module.

6. The peer-to-peer network according to claim 1,
wherein at least one node comprises at least one controlling module having at least one detecting means configured to detect at least one operation error of the node,
wherein the controlling module comprises at least one evaluating means configured to evaluate whether the detected operation error requires a data synchronization of the data stored in the peer-to-peer application of the node, and
wherein the controlling module comprises at least one initiating means configured to initiate a data synchronization action if data synchronization is required.

7. The peer-to-peer network according to claim 6,
wherein the initiating means of the controlling module is configured to initiate a data synchronization by transmitting a data synchronization indication to at least one communication module of the node, and
wherein the communication module is configured to transmit a data synchronization request message to at least one further node of the peer-to-peer network upon receipt of the data synchronization indication.

8. The peer-to-peer network according to claim 7, wherein the communication module is further configured to perform, upon receipt of the data synchronization indication, at least one data synchronization action from the data synchronization actions comprising:
    providing data synchronization request message with a priority information, and
    transmitting at least one bandwidth allocation request message to at least one communication network controlling unit.

9. The peer-to-peer network according to claim 8,
wherein the communication network controlling unit comprises at least one bandwidth allocation module configured to modify the available bandwidth of at least one communication connection between the node and the further node, and
wherein the bandwidth allocation module is configured to increase the bandwidth of the communication connection between the node and the further node at least based on the received bandwidth allocation request message.

10. The peer-to-peer network according to claim 9,
wherein the bandwidth allocation module is configured to check upon receipt of the bandwidth allocation request message at least one preset authorization criterion, and
wherein the bandwidth allocation module is configured to increase the bandwidth of the communication connection between the node and the further node only in the case the at least one preset authorization criterion is met by the node.

11. The peer-to-peer network according to claim 10,
wherein the communication network controlling unit comprises at least one peer-to-peer module at least configured to read at least one preset authorization criterion stored in the peer-to-peer application or in a database controlled by the peer-to-peer application,
wherein the bandwidth allocation module is configured to compare an authorization information included in the bandwidth allocation request message with at least one read preset authorization criterion.

12. The peer-to-peer network according to claim 1,
wherein the peer-to-peer network comprises at least one further unit in form of at least one sensor and/or at least one actor configured to communicate with at least one node;
wherein the further unit comprises a unique peer-to-peer identification registered in the peer-to-peer application, and
wherein the further unit comprises a signing module configured to sign a message to be sent to the node.

13. The peer-to-peer network according to claim 12,
wherein the further unit is assigned to at least one node of the peer-to-peer network,
wherein the assignment between the further unit and the node is stored in the peer-to-peer application or in a database controlled by the peer-to-peer application.

14. The peer-to-peer network according to claim 12,
wherein at least one technical specification data set of the further unit is stored in the peer-to-peer application or in a database controlled by the peer-to-peer application, and
wherein at least the receiving node of the message is configured to validate the data included in a message received from the further unit based on the stored technical specification data set.

15. The peer-to-peer network according to claim 1,
wherein the peer-to-peer application is a decentralized register or a shared database,
wherein the peer-to-peer application is configured to store data with given certain proofs or signatures.

16. The peer-to-peer network according to claim 1, wherein the peer-to-peer application is a block chain or decentral ledger comprising at least two blocks coupled to each other.

17. The peer-to-peer network according to claim 1, wherein at least one node is configured to validate at least one message received and/or generated by the peer-to-peer application.

18. A method for operating at least one peer-to-peer network, in particular, a peer-to peer network according to claim 1, wherein the peer-to peer network comprises at least one first node comprising at least one first clock module and at least a part of at least one peer-to-peer application and at least one second node comprising at least one second clock module and at least a part of the peer-to-peer application, the method comprising:
    transmitting at least one first synchronization clock message from a first synchronization clock module of the first node to a second synchronization clock module of the second node via a communication connection between the first node and the second node, and
    synchronizing the clock signal of the second clock module to the clock signal of the first clock module based on synchronization information included in the received first synchronization clock message,
    signing the first synchronization clock message with a signature by the first node, and
    validating the signature of the first synchronization clock message by two or more nodes of the nodes of the peer-to-peer network.

19. A second node of a peer-to peer network according to claim 1, the second node comprising:
    at least one second clock module,
    at least a part of at least one peer-to-peer application,
    at least one communication module configured to receive at least one first synchronization clock message from a first node of the peer-to peer network, and
    at least one second synchronization clock module configured to synchronize the clock signal of the second clock module to the clock signal of a first clock module of the first node) based on synchronization information included in the received first synchronization clock message, wherein the first synchronization clock message is processed only in case the signature of the first synchronization clock message is valid, wherein the signature of the first synchronization clock message is validated by two or more nodes of the nodes of the peer-to-peer network.

* * * * *